US006127925A

United States Patent [19]

Bonsignore et al.

[11] Patent Number: 6,127,925

[45] Date of Patent: Oct. 3, 2000

[54] SIGNALLING AND/OR HELP REQUEST SYSTEM

[75] Inventors: Francesco Bonsignore, Via Palmieri; Diego Taglioni, Velletri, both of Italy

[73] Assignee: Citycom S.p.A., Genoa, Italy

[21] Appl. No.: 09/147,025

[22] PCT Filed: Mar. 12, 1997

[86] PCT No.: PCT/IT97/00057

§ 371 Date: Sep. 14, 1998

§ 102(e) Date: Sep. 14, 1998

[87] PCT Pub. No.: WO97/34272

PCT Pub. Date: Sep. 18, 1997

[30] Foreign Application Priority Data

Mar. 12, 1996 [IT] Italy ................................ TO96A0183

[51] Int. Cl.[7] ................................ G08B 1/08; H04B 1/00

[52] U.S. Cl. .................... 340/539; 340/310.01; 340/531; 340/538; 340/825.69; 340/825.72; 379/37

[58] Field of Search .............................. 340/539, 310.01, 340/538, 531, 825.69, 825.72; 379/37, 38

[56] References Cited

U.S. PATENT DOCUMENTS 4,998,095 3/1991 Shields .................................. 340/538

FOREIGN PATENT DOCUMENTS 9408119 8/1994 Germany .
2291993 7/1996 United Kingdom .

OTHER PUBLICATIONS

"A Prison Guard Duress Alarm Location System", Thomas W. Christ et al, IEEE Jan. 1993 pp. 106–116.

*Primary Examiner*—Donnie L. Crosland
*Attorney, Agent, or Firm*—Oblon, Spivak, McClelland, Maier & Neustadt, P.C.

[57] ABSTRACT

A signaling and/or help request system. A remote transmitter transmits an alarm signal which is received by a receiving/convening device which cooperates with the transmitter. The receiving/conveying device is fitted to a street lamp to transmit a message including an identification code to the electrical supply means. a receiving unit connected to the supply means extracts the messages supplied by the receiving/conveying device and supplies them through a network to a centralized receiver to generate a help request output signal.

16 Claims, 2 Drawing Sheets

SIGNALLING AND/OR HELP REQUEST SYSTEM

BACKGROUND OF THE INVENTION

1. Field of the Invention

The present invention relates to a signalling and/or help request system.

2. Discussion of the Background

As is known, in big cities, particularly during celebrations, manifestations or any occasion involving large crowds, risk situations occur continually in which help is required either of the authorities or specific groups of people trained to deal with specific problems. This is especially true of tourists or visitors on business, who are unfamiliar with the city and fall prey to bag-snatchers, muggers, etc. The need to send out a position signal or request for help may also arise in the case of sickness, or in the event of tourists or visiting businessmen losing their way in a foreign city and, not speaking the language, being unable to ask directions of passers-by.

Public telephones are not always a solution, owing to lack of change, telephone cards, or a nearby telephone booth, or on account of the urgency of the situation; and portable telephones are not yet of such a price as to be generally available, especially when such risk situations are only occasional.

SUMMARY OF THE INVENTION

It is an object of the present invention to provide a signalling and/or help request system designed to overcome the aforementioned problems.

According to the present invention, there is provided a signalling and/or help request system, characterized by comprising:

a remote transmitter for transmitting an alarm signal;

a receiving/conveying device cooperating with said transmitter, fitted to a lamp of the public lighting system, and connected to the electricity mains and to a communications network to transmit a message including an identification code;

a centralized receiving device for receiving messages transmitted by said receiving/conveying device, and generating an information and/or help request output signal.

BRIEF DESCRIPTION OF DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
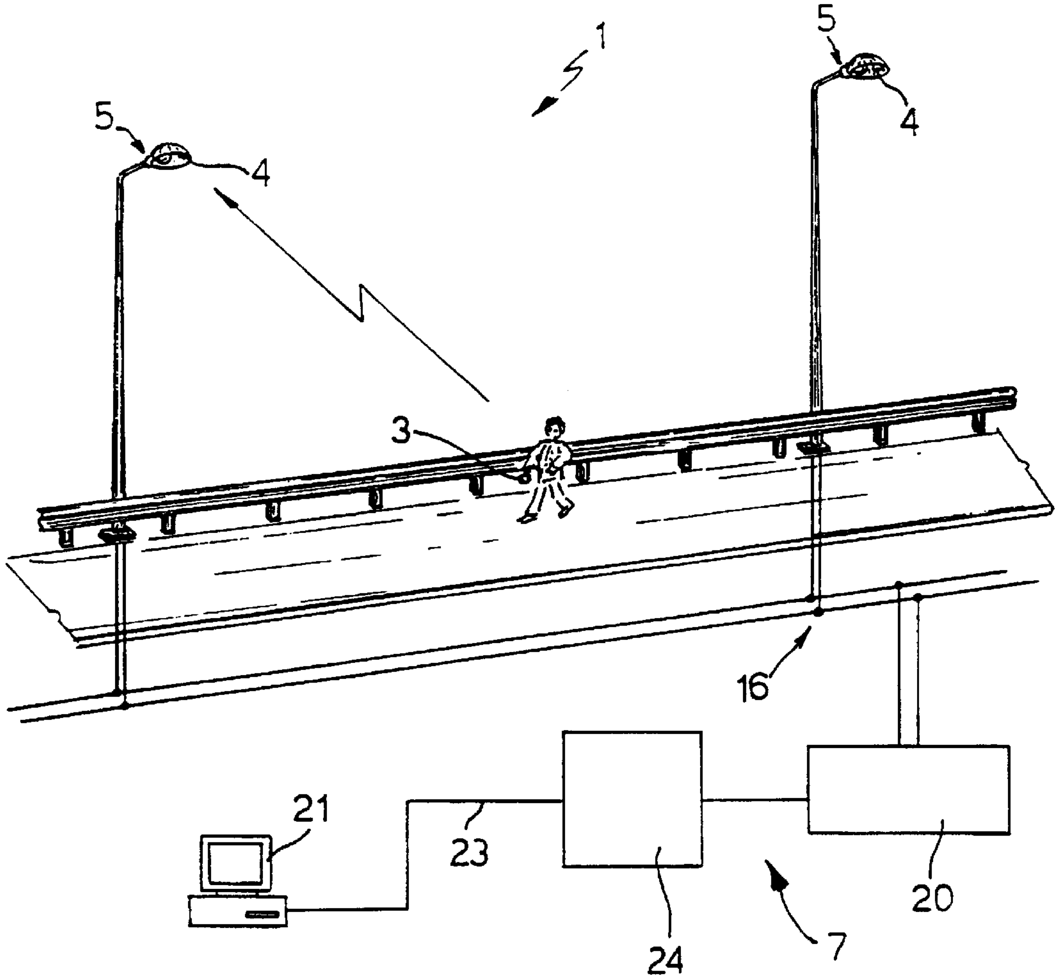
FIG. 1 shows an overall view of the system according to the invention.

Number 1 in FIG. 1 indicates the system as a whole, which comprises a portable transmitter 3; a receiving/conveying device 4 suitable for transmitter 3 and fitted to a lamp 5 of the public lighting system to receive a help request from transmitter 3 and transmit messages along the electricity line of the lamp; and a centralized signal receiving and processing system 7 connected to the electricity line.

Figure 2:
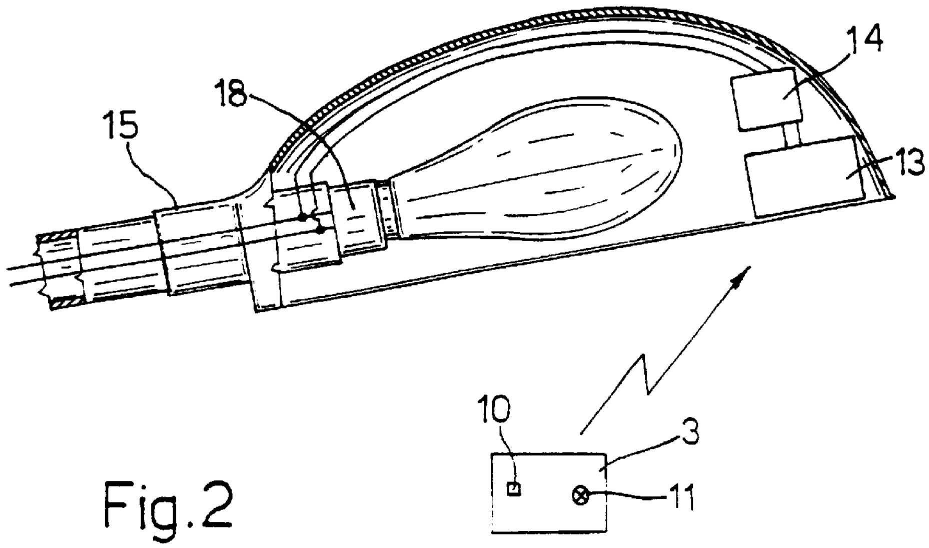
FIG. 2 shows a more detailed view of part of the system according to the invention.
Figure 3:
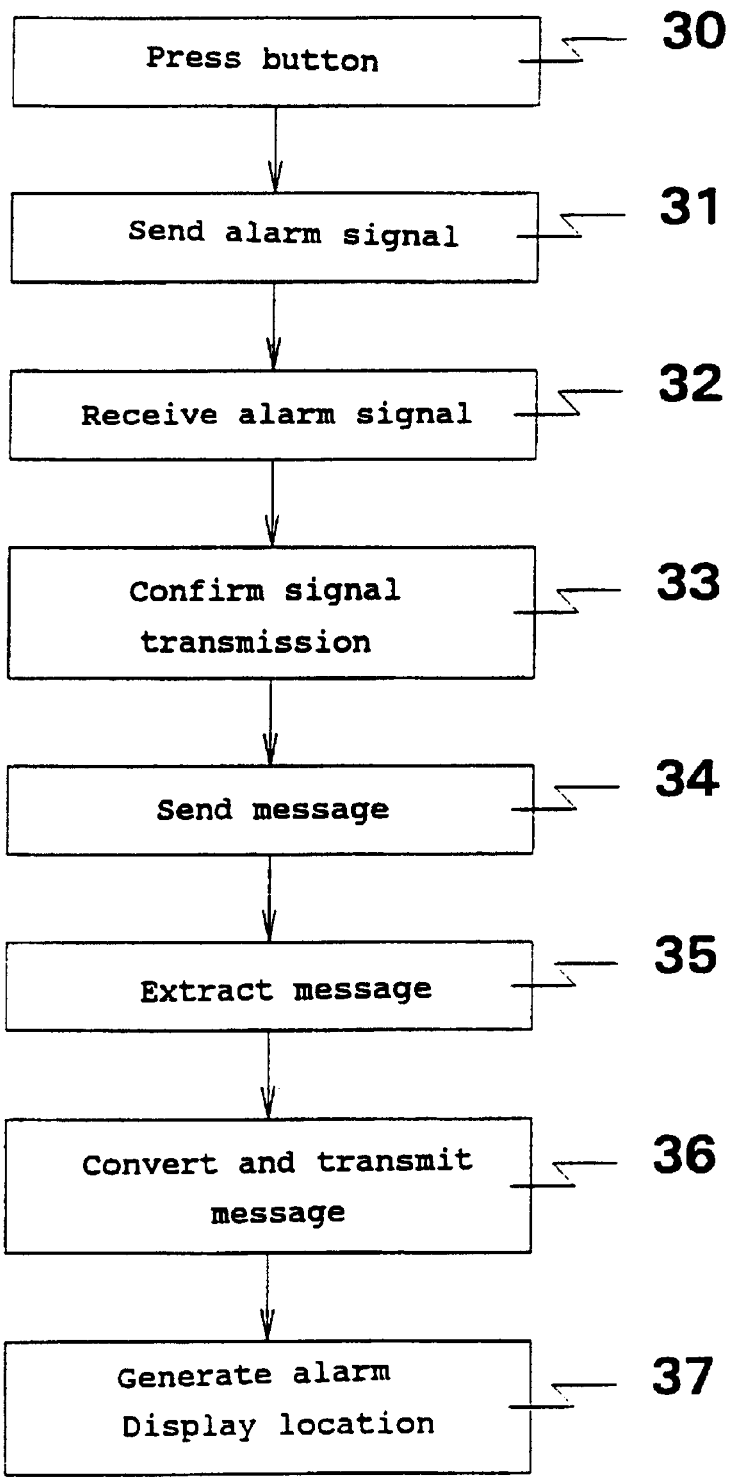
FIG. 3 shows an operation block diagram of the system according to the invention.

More specifically, and with reference also to FIGS. 2 and 3, transmitter 3 is preferably a commercial remote-control transmitter, for example, of the type commonly used to open gates and doors, and advantageously comprises a single button 10, which, when pressed (block 30 in FIG. 3), enables a circuit to transmit an analog or digital alarm signal (block 31). Alternatively, provision may be made for two or more buttons for transmitting different signals and help requests, in which case, a different alarm signal (code) is transmitted when each button is pressed. The alarm signal may be transmitted by radio or any other wireless (e.g. infrared) transmission technique. Transmitter 3 may preferably also operate as a receiver for receiving a confirmation code generated by receiver 4, and, for this purpose, may comprise an indicator light 11 (e.g. coloured LED) to show the help request has been transmitted.

Receiving/conveying device 4 comprises a receiver 13; a conveyed-wave transmitting device 14; and a shunt element 15. More specifically, receiver 13 is preferably a commercial type, and comprises known electric circuits for receiving the alarm signal transmitted by transmitter 3 (block 32 in FIG. 3) and transmitting a signal to conveyed-wave transmitting device 14 (block 33). Receiver 13 may also comprise circuits for supplying transmitter 3 with a reception confirmation signal, as stated above.

Conveyed-wave transmitting device 14 may also be a commercial type, e.g. of the sort used on intercoms, and, upon a signal being received by receiver 13, generates a message comprising a help request code and a specific identification code (block 34 in FIG. 3). This signal is supplied to shunt element 15, which transmits the message onto the electricity mains 16 to which lamp 5 is connected. To enable troublefree installation of the system, the shunt element is advantageously enclosed in a casing fittable easily (e.g. screwed or inserted) onto the lamp-holder 18 of lamp 5.

Centralized signal receiving and processing system 7 comprises a conveyed-wave receiving device 20 and a processing unit 21.

More specifically, conveyed-wave receiving device 20 is appropriately connected to electricity mains 16 to extract the messages transmitted via a number of lamps 5 (e.g. all the lamps in a given part of the city—block 35 in FIG. 3), and converts the received message into serial digital form and transmits it to processing unit 21, preferably a computer (block 36). Transmission may be effected in any form, by means of a serial cable connection 23 and public telephone network (indicated schematically by block 24 in FIG. 1), or by radio or any other suitable communications network. Device 20 is suitably located to receive the messages, and a number of devices 20 may be located in different parts of the city, in which case, a concentrator may be provided between the various devices 20 and computer 21.

The software of computer 21 is such as to control the messages received via device 20 and generate operator signals. More specifically, computer 21 may be equipped with graphic programs for displaying the toponymy and/or topography (lamp) of the call, or with an alphanumeric and acoustic system for generating written operator messages and acoustic signals (block 37 in FIG. 3).

Computer 21 may be set up in an appropriate location, such as a local or central police station, or a special center for dealing with help calls.

Operation of system 1 will be clear from the foregoing description. In particular, the present system provides for a surveillance network covering a wide territory, such as that of a large city (but also small towns or lighted suburban roads), in an extremely straightforward low-cost manner, by exploiting the existing electricity mains and using low-cost, easy-to-install devices. Moreover, transmitter 3 is cheap and compact enough to enable anyone to make use of such a surveillance network.

Clearly, changes may be made to the system as described and illustrated herein without, however, departing from the scope of the present invention. In particular, transmitter 3 may, as stated, be a straightforward type for transmitting a straightforward signal, or more complex for transmitting and/or confirming even complex messages. As opposed to conveyed-wave transmission over an electricity line, transmission between receiver 4 and device 20 may also be effected using other techniques, e.g. by radio, in which case, the electricity mains connection serves solely to supply receiver 4. Similarly, as stated, transmission between transmitter 3 and receiver 4, and between device 20 and computer 21 may be effected using any appropriate technique, and centralized signal control may be adapted to meet various requirements.

We claim:

1. A signaling and/or help request system comprising:

a remote transmitter for transmitting an alarm signal;

a receiving/conveying device cooperating with said transmitter and fitted to a lamp of a public lighting system to generate a message including an identification code;

a communications network for transmitting the messages generated by said receiving/conveying device; and a centralized receiving device connected to said communications network and for receiving the messages transmitted by said receiving/conveying device, and generating an information and/or help request output signal; wherein, said receiving/conveying device comprises a receiving element for receiving said alarm signal; and a conveyed-wave transmitting device for transmitting said message onto electricity supply mains.

2. A system as claimed in claim 1, wherein said communications network comprises a telephone network.

3. A system as claimed in claim 1, wherein said receiving element comprises means for transmitting a confirmation signal; and said transmitter comprises reception confirming means for receiving and displaying reception of said confirmation signal.

4. A system as claimed in claim 1, wherein said receiving/conveying device also comprises a shunt element connectable to said electricity supply mains at a lamp-holder of said lamp.

5. A system as claimed in claim 1, comprising a receiving unit interposed between said receiving/conveying device and said centralized receiving device, and for transmitting said messages to said centralized receiving device via said communications network.

6. A system as claimed in claim 5, wherein said receiving unit comprises a conveyed-wave receiving device connectable to said electricity supply mains.

7. A system as claimed in claim 6, wherein said conveyed-wave receiving device comprises means for converting said message into digital form.

8. A system as claimed in claim 1, wherein said centralized receiving device comprises a processing unit for generating visual and/or acoustic signaling and/or help request signals.

9. A system as claimed in claim 3, comprising a receiving unit interposed between said receiving/conveying device and said centralized receiving device, and for transmitting said messages to said centralized receiving device via said communication network.

10. A system as claimed in claim 3, wherein said centralized receiving device comprises a processing unit for generating visual and/or acoustic signaling and/or help request signals.

11. A system as claimed in claim 4, wherein said centralized receiving device comprises a processing unit for generating visual and/or acoustic signaling and/or help request signals.

12. A system as claimed in claim 5, wherein said centralized receiving device comprises a processing unit for generating visual and/or acoustic signaling and/or help request signals.

13. A system as claimed in claim 6, wherein said centralized receiving device comprises a processing unit for generating visual and/or acoustic signaling and/or help request signals.

14. A system as claimed in claim 3, wherein said communications network comprises a telephone network.

15. A system as claimed in claim 4, wherein said communications network comprises a telephone network.

16. A system as claimed in claim 5, wherein said communications network comprises a telephone network.

* * * * *